(No Model.)
C. HUNT.
LEMON PULP REMOVER AND STRAINER.
No. 597,851. Patented Jan. 25, 1898.
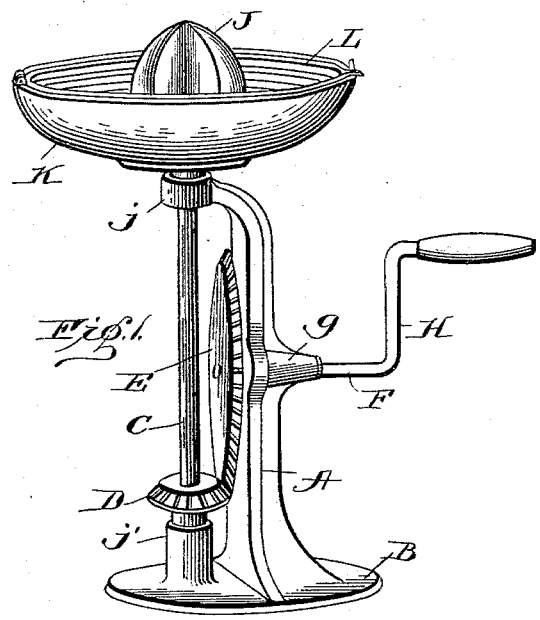
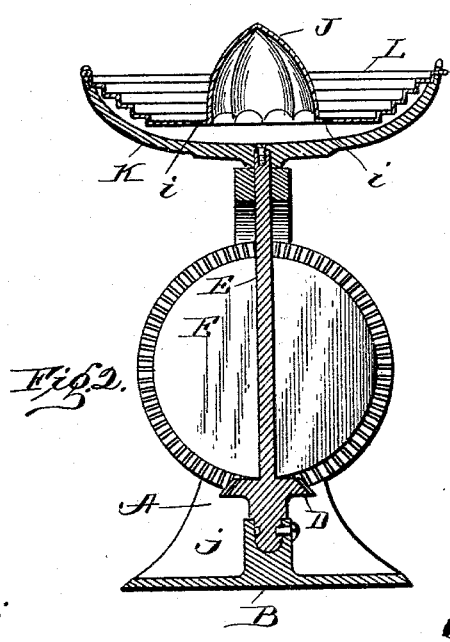
Witnesses:
N. Curtis Lammond
Wallace Murdock
Inventor:
Charles Hunt
By J. M. Fowler Jr.
his Attorney
THE NORRIS PETERS CO., PHOTO-LITHO., WASHINGTON, D. C.

UNITED STATES PATENT OFFICE.

CHARLES HUNT, OF SYRACUSE, NEW YORK.

LEMON-PULP REMOVER AND STRAINER.

SPECIFICATION forming part of Letters Patent No. 597,851, dated January 25, 1898.

Application filed April 17, 1897. Serial No. 632,638. (No model.)

*To all whom it may concern:*

Be it known that I, CHARLES HUNT, of Syracuse, in the county of Onondaga and State of New York, have invented an Improvement in Lemon-Pulp Removers and Strainers, of which the following is a specification.

My invention relates to a lemon-pulp remover and strainer, and has for its object to provide a device by which the pulp of a lemon or orange can be quickly and thoroughly removed by attrition and ejected for the purpose of extracting the juice and which will admit of straining and removing the juice at one operation.

To these ends my invention consists of a bowl or receptacle closed at the top by a funnel-shaped lid that supports a centrally-located upwardly-projecting cone which bears on its face vertically-disposed scraping blades or corrugations and in arranging in connection therewith a positive mechanism for rotating said bowl.

The device is illustrated by the accompanying drawings, in which—

Figure 1 represents a side elevation of the device, while Fig. 2 represents in like view a cross-section thereof.

Like letters of reference indicate like parts in both figures.

The device consists of a suitable-shaped standard A, which is supported in a vertical position on the base B. The upper portion of said standard extends laterally to form an arm for supporting an upright shaft. Passing through a journal *j* in said arm and resting on the step or journal bearing *j'* in the base B is a vertical shaft or spindle C, which is provided with a bevel gear-wheel D. Into this bevel-wheel gears a larger wheel E, Fig. 1, that is mounted on the inner end of a horizontal shaft F, adapted to a bearing *g* in the standard. The shaft F is provided at its outer end with a crank H for turning the same.

Mounted in proper balance at the end of the upright shaft and adapted to be rotated thereby is a bowl or receptacle K, which is preferably of a semiglobular shape. Spanning the mouth of said bowl and removably attached to its rim is a funnel-shaped straining receptacle or tray L, that extends with inclined ribbed walls downwardly into said bowl, the walls and bottom thereof being provided with perforations or discharge-openings *i i*, that allow the running juices to drip into the bowl. Arranged centrally in the bottom of said strainer L and formed integral therewith is an upwardly-projecting cone J, that bears on its face a plurality of vertically-disposed scraping blades or corrugations *r r*.

The operation is as follows: The lemon to be used is cut in half and in turn each half is forced gradually onto the cone J and held thereon by the pressure of the hand while the crank is rapidly turned to revolve the cone and eject the pulp.

Having described my invention, what I claim as new and useful is—

1. The combination of a vertically-rotating shaft, means for rotating the shaft; and a bowl mounted on the top of said shaft a cover or lid therefor, said lid being provided with a perforated bottom and a centrally-located upwardly-projecting cone, substantially as described.

2. In a lemon-pulp remover the rotating bowl having its mouth closed by a funnel-shaped lid, having its inwardly-inclined walls stepped and perforated, and a cone rising centrally therefrom, that is provided with a plurality of vertically-disposed blades or corrugations and means for rotating said bowl, substantially as and for the purpose set forth.

CHARLES HUNT.

Witnesses:
 N. CURTIS LAMMOND,
 WALLACE MURDOCK.